United States Patent
Li et al.

(10) Patent No.: US 10,760,464 B2
(45) Date of Patent: Sep. 1, 2020

(54) METHODS FOR MONITORING AND REGENERATING SELECTIVE CATALYTIC REDUCTION FILTER DEVICES

(71) Applicant: GM GLOBAL TECHNOLOGY OPERATIONS LLC, Detroit, MI (US)

(72) Inventors: Jianwen Li, Farmington Hills, MI (US); Rahul Mital, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 259 days.

(21) Appl. No.: 15/670,043

(22) Filed: Aug. 7, 2017

(65) Prior Publication Data
US 2019/0040783 A1   Feb. 7, 2019

(51) Int. Cl.
*F01N 9/00* (2006.01)
*F01N 3/035* (2006.01)
*F01N 3/20* (2006.01)

(52) U.S. Cl.
CPC ............ *F01N 9/002* (2013.01); *F01N 3/035* (2013.01); *F01N 3/2066* (2013.01); *F01N 2330/48* (2013.01); *F01N 2370/04* (2013.01); *F01N 2560/08* (2013.01); *F01N 2900/1406* (2013.01); *F01N 2900/1606* (2013.01)

(58) Field of Classification Search
CPC .... Y02T 10/47; F01N 11/002; F01N 2260/04; F01N 2330/06; F01N 2430/00; F01N 2550/04; F01N 2560/08; F01N 2900/0402; F01N 2900/1406; F01N 3/022; F01N 3/0222; F01N 3/023; F01N 9/002; F02B 37/00; F02D 2200/0812; F02D 41/029; F02D 41/1448; Y10S 55/10; Y10S 55/30
See application file for complete search history.

(56) References Cited

U.S. PATENT DOCUMENTS

2004/0139852 A1* 7/2004 Koga ............... F01N 3/0222 95/20
2014/0371054 A1* 12/2014 Whitt ............... B01J 38/00 502/20

* cited by examiner

*Primary Examiner* — Anthony Ayala Delgado

(57) ABSTRACT

Methods for monitoring and/or regenerating a selective catalytic reduction particulate filter (SCRF) are provided. The SCRF comprises a porous filter substrate and a catalytic composition capable of reducing NOx applied thereto. Methods include determining a SCRF pressure differential (dP) and determining the SCRF soot loading using a 1st SCRF dP map if the SCRF has not been degreened, or a 2nd SCRF dP map if the SCRF has been degreened. The SCRF has been degreened if one or more of a degreening cumulative time and temperature threshold has been achieved and a filter regeneration count threshold has been achieved. The 1st and 2nd SCRF dP maps correlate SCRF dP and one or more of SCRF temperature, exhaust mass flow, and exhaust volumetric flow to a SCRF soot loading. The method can optionally further include initiating a filter regeneration if the determined SCRF soot loading is above a soot loading threshold.

11 Claims, 2 Drawing Sheets

METHODS FOR MONITORING AND REGENERATING SELECTIVE CATALYTIC REDUCTION FILTER DEVICES

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons, oxides of nitrogen ($NO_x$), and oxides of sulfur ($SO_x$), as well as condensed phase carbonaceous materials (liquids and solids) that constitute soot. Liquids can include water and hydrocarbons, for example.

Exhaust gas treatment systems may employ catalysts in one or more components configured for accomplishing an after-treatment process such as reducing $NO_x$ to produce more tolerable exhaust constituents of nitrogen ($N_2$) and water ($H_2O$). One type of exhaust treatment technology for reducing $NO_x$ emissions is a selective catalytic reduction (SCR) device, which generally includes a substrate or support with a catalytic composition disposed thereon. Passing exhaust over the catalyst converts certain or all exhaust constituents in desired compounds, such as non-regulated exhaust gas components. A reductant is typically sprayed into hot exhaust gases upstream of the SCR, decomposed into ammonia, and absorbed by the SCR. The ammonia then reduces the $NO_x$ to nitrogen and water in the presence of the SCR catalyst. A selective catalytic reduction filter device includes the SCR catalytic composition applied to a porous filter substrate. Soot accumulating in a SCRF can be periodically oxidized, combusted, or otherwise removed during high temperature regeneration events.

SUMMARY

A method for determining soot loading in a selective catalytic reduction particulate filter device (SCRF) utilized by an internal combustion engine (ICE) exhaust gas treatment system is provided. The exhaust gas treatment system can include an ICE configured to communicate exhaust gas to the SCRF, and the SCRF can comprise a porous filter substrate and a catalytic composition capable of reducing NOx species applied thereto. The method can include determining a SCRF pressure differential (dP), and determining a SCRF soot loading using a 1st SCRF dP map if neither a filter regeneration count threshold nor a degreening cumulative time and temperature threshold are achieved, or a 2nd SCRF dP map if at least one of a filter regeneration count threshold or the degreening cumulative time and temperature threshold is achieved. The SCRF soot loading can be determined using the 2nd SCRF dP map if both the filter regeneration count threshold and the filter regeneration cumulative time and temperature threshold are achieved. The SCRF catalytic composition can be configured to utilize a reductant to reduce NOx species. The cumulative time and temperature threshold can include a time-temperature map wherein the respective time and temperature magnitudes of a plurality of time and temperature thresholds vary inversely. The 1st SCRF dP map and the 2nd SCRF dP map can correlate the SCRF dP to a SCRF soot loading level. The 1st SCRF dP map and the 2nd SCRF dP map can correlate resistance flow and the SCRF dP to a SCRF soot loading level, wherein resistance flow can be calculated by dividing the SCRF dP by the volumetric flow rate of exhaust gas through the SCRF.

A method for determining soot loading in a SCRF is provided. The SCRF can include a porous filter substrate and a catalytic composition capable of reducing NOx applied thereto, and can be configured to receive exhaust gas. The method can include determining a SCRF dP, and determining a SCRF soot loading using a 1st SCRF dP map if the SCRF has not been degreened or a 2nd SCRF dP map if the SCRF has been degreened. The SCRF can be considered degreened if a degreening cumulative time and temperature threshold has been achieved. The SCRF filter substrate can have a porosity of at least about 60%. The SCRF filter substrate can have a porosity of about 55% to about 75%. The SCRF can have a catalytic composition loading of about 60 grams per liter to about 180 grams per liter. The SCRF filter substrate can have an average pore size of about 12 micrometers to about 28 micrometers. The SCRF catalytic composition can be a metal-impregnated zeolite. The 1st SCRF dP map and the 2nd SCRF dP map can correlate the SCRF dP, the SCRF temperature, and the mass flow of exhaust gas through the SCRF to a SCRF soot loading level.

A method for regenerating a SCRF utilized by an ICE exhaust gas treatment system is provided. The exhaust gas treatment system can include an ICE configured to communicate exhaust gas to the SCRF, and the SCRF can include a porous filter substrate and a catalytic composition capable of reducing NOx applied thereto, the method can include determining a SCRF dP, determining a SCRF soot loading using a 1st SCRF dP map if the SCRF has not been degreened, or a 2nd SCRF dP map if the SCRF has been degreened, and initiating a filter regeneration if the determined SCRF soot loading is above a soot loading threshold. The SCRF can be considered degreened if a degreening cumulative time and temperature threshold has been achieved. The SCRF can be considered degreened if a filter regeneration count threshold has been achieved. The filter regeneration can include raising the temperature of exhaust gas and/or the filter substrate by one or more of manipulating ICE calibrations to implement a post-injection strategy, utilizing an electrically heated catalyst, utilizing an electric heater, and utilizing an oxidizing catalyst device disposed upstream from the SCRF in combination with one or more of an after-injection strategy and an auxiliary injection strategy hydrocarbon injection strategy. The 1st SCRF dP map and the 2nd SCRF dP map can correlate the SCRF dP and one or more of the SCRF temperature, the mass flow of exhaust gas through the SCRF, and the volumetric flow of exhaust gas through the SCRF to a SCRF soot loading level. The SCRF filter substrate can have a porosity of at least about 52%.

Other objects, advantages and novel features of the exemplary embodiments will become more apparent from the following detailed description of exemplary embodiments and the accompanying drawings.

DETAILED DESCRIPTION

Figure 1:
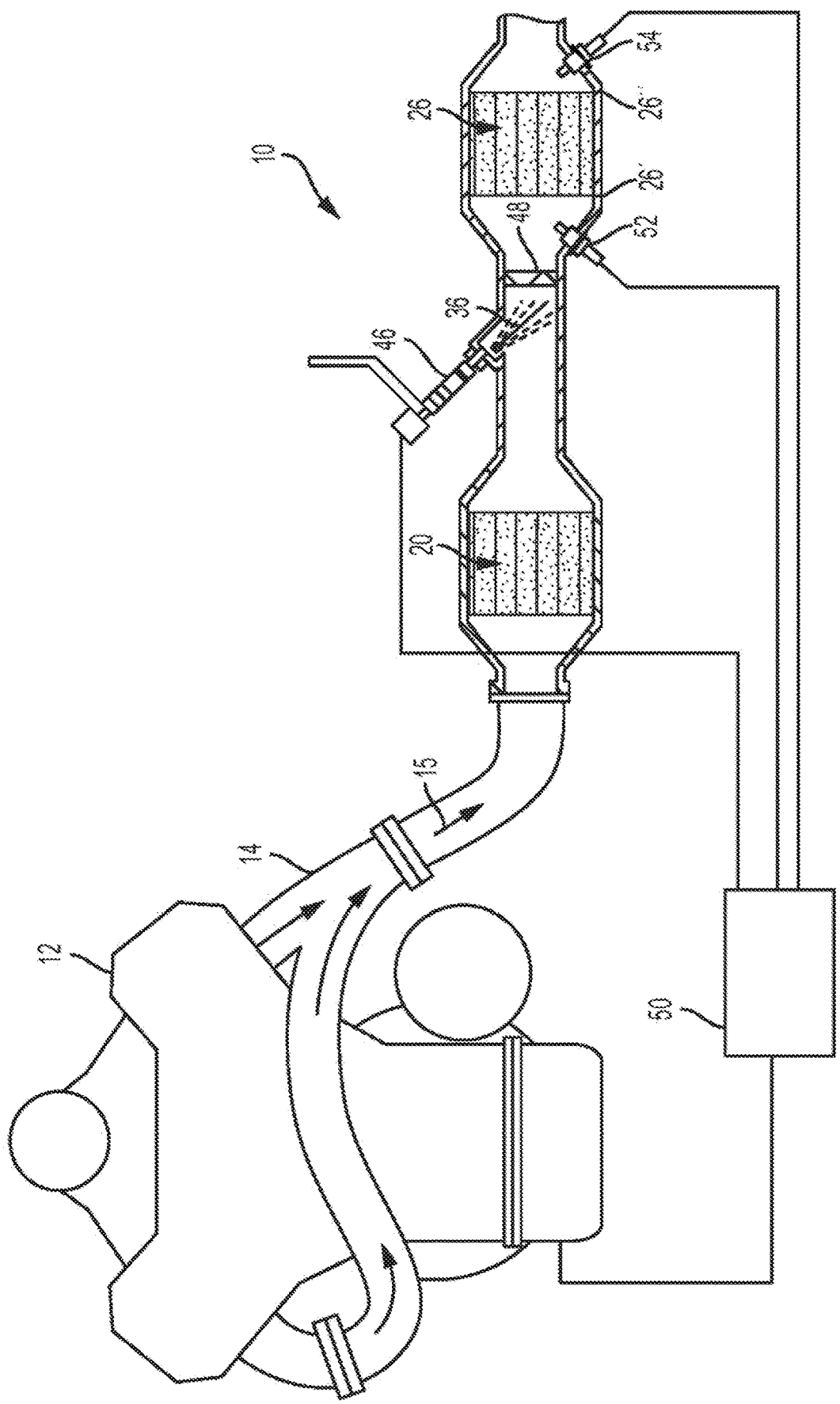
FIG. 1 illustrates an schematic view of an exhaust gas treatment system, according to one or more embodiments.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure pertains to the control and monitoring of $NO_x$ storage and/or treatment materials, devices, and systems. In particular, this disclosure provides methods for monitoring and controlling selective catalytic reduction filter devices (SCRF), wherein the SCRFs are configured to receive exhaust gas streams from an exhaust gas source. Provided herein are methods for monitoring the accumulation of soot within an SCRF, and for initiating the removal thereof. Soot generally includes carbonaceous particulate matter and other solid and/or liquid carbon-containing species which are germane to ICE exhaust gas or form within an exhaust gas treatment system. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$.

In some embodiments, the exhaust gas source generating the exhaust gas streams can be an internal combustion engine (ICE). Methods described herein are germane to ICE systems that can include, but are not limited to, diesel engine systems, gasoline direct injection systems, and homogeneous charge compression ignition engine systems. An ICE can include a plurality of reciprocating pistons attached to a crankshaft which may be operably attached to a driveline, such as a vehicle driveline, to power a vehicle (e.g., deliver tractive torque to the driveline). For example, an ICE can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore when reference is made to a vehicle, such disclosure should be interpreted as applicable to any application of an ICE.

Moreover, an ICE can generally represent any device capable of generating an exhaust gas stream comprising gaseous (e.g., $NO_x$, $O_2$), and/or soot species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more $NO_x$ species, one or more liquid hydrocarbon species, and soot.

FIG. 1 illustrates an exhaust gas treatment system 10 for treating and/or monitoring the exhaust gas 15 constituents of an ICE 12. System 10 generally includes one or more exhaust gas conduits 14, and one or more exhaust treatment devices. The exhaust gas conduit 14, which can comprise several segments, transports exhaust gas 15 from the ICE 12 to the various exhaust treatment devices of the exhaust gas treatment system 10. In some exemplary embodiments, exhaust gas 15 can comprise $NO_x$ species.

In embodiment as illustrated, system 10 comprises SCRF 26. In general, SCRF 26 includes all devices which utilize filter components to remove soot from exhaust gas 15 and selective catalytic reduction (SCR) catalytic components in combination with reductant 36 to convert NOx species (e.g., NO and $NO_2$) to harmless components. Upstream and downstream are defined in relation to the direction of the flow of exhaust gas 15 from ICE 12. As shown in FIG. 1, SCRF 26 includes an upstream side 26' and a downstream side 26". SCRF 26 is configured to receive reductant, such as at variable dosing rates. Reductant 36 can be supplied from a reductant supply source (not shown) and injected into the exhaust gas conduit 14 at a location upstream of the SCRF 26 using an injector 46, or other suitable method of delivery. Reductant 36 can be in the form of a gas, a liquid, or an aqueous solution, such as an aqueous urea solution. Reductant 36 can be mixed with air in the injector 46 to aid in the dispersion of the injected spray. A turbulator 48 (i.e., mixer) can also be disposed within the exhaust conduit 14 in close proximity to the injector 46 and/or the SCRF 26 to further assist in thorough mixing of reductant 36 with the exhaust gas 15 and/or even distribution throughout the SCRF 26.

System 10 can optionally further include oxidation catalyst device (OC) 20. OC 20 can be utilized to oxidize $NO_x$ and other species present in exhaust gas 15. In some embodiments an OC, such as a diesel oxidation catalyst device (DOC), can be positioned upstream from SCRF 26 to convert NO into $NO_2$ for preferential treatment in SCRF 26. For example, in some embodiments, OC 20 can be utilized to convert NO into $NO_2$ in order to optimize the exhaust gas $NO:NO_2$ ratio for downstream SCRF 26, which generally operates more efficiently with exhaust gas feed streams having a $NO:NO_2$ ratio of about 1:1. OC 20 can optionally additionally or alternatively convert various regulated exhaust constituents to other regulated or unregulated exhaust constituents through oxidation. For example, OC 20 can be configured to oxidize hydrocarbons (HC) to carbon dioxide $CO_2$ and water ($H_2O$), convert carbon monoxide (CO) to carbon dioxide ($CO_2$), and convert sulfur dioxide ($SO_2$) to sulfur trioxide ($SO_3$) and/or sulfuric acid ($H_2SO_4$). Some examples of HC oxidations include oxidation of aldehydes, polycyclic aromatic hydrocarbons, or non-volatile unburned hydrocarbons, and unburned fuel. When combustible species, particularly HC species, are present within OC 20, oxidation can comprise combustion. Further, the reactions in OC 20 can be used to reduce the odor of certain emission components.

OC 20 includes one or more catalytic compositions, to facilitate the oxidation of one or more of NOx species, CO, and HC species. Catalytic compositions can include one or more platinum group metals including platinum (Pt), palladium (Pd), rhodium (Rh) or other metal oxide catalysts such as perovksites, ruthenium (Ru), osmium (Os), iridium (Ir), or combinations thereof. Optional OC 20 can include, for example, a flow-through metal or ceramic monolith substrate that can be packaged in a stainless steel shell or canister having an inlet and an outlet in fluid communication with exhaust gas conduit 14. The OC catalytic compound can be disposed one more or of the substrate and canister, for example. The oxidation catalyst compound can be applied to the substrate and/or canister as a wash coat, in some embodiments.

System 10 can further include a control module 50 operably connected via a number of sensors to monitor ICE 12 and/or the exhaust gas treatment system 10. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. The control module 50 can be operably connected to ICE 12, SCRF 26, and/or one or more sensors. As shown, control module 50 is in communication upstream pressure sensor 52, disposed upstream of SCRF 26, and downstream pressure sensor 54, disposed downstream of SCRF 26, each of which are in fluid communication with exhaust gas conduit 14. Upstream pressure sensor 52 and downstream pressure sensor can be used to determine a pressure differential (dP) across SCRF 26, although it is understood that the SCRF 26 dP can be determined by other means, including sensing and modeling means. For example, module 50 can determine the SCRF 26 dP by subtracting a pressure signal generated by upstream pressure sensor 52 from a pressure signal generated by downstream pressure sensor 54. Control module 50 can optionally be in communication one or more temperature sensors, mass flow sensors, volumetric flow sensors, and NOx sensors (not shown). For example, one or more temperature sensors may additionally or alternatively be disposed to directly measure temperature of the SCRF 26 catalytic compositions.

Figure 2:
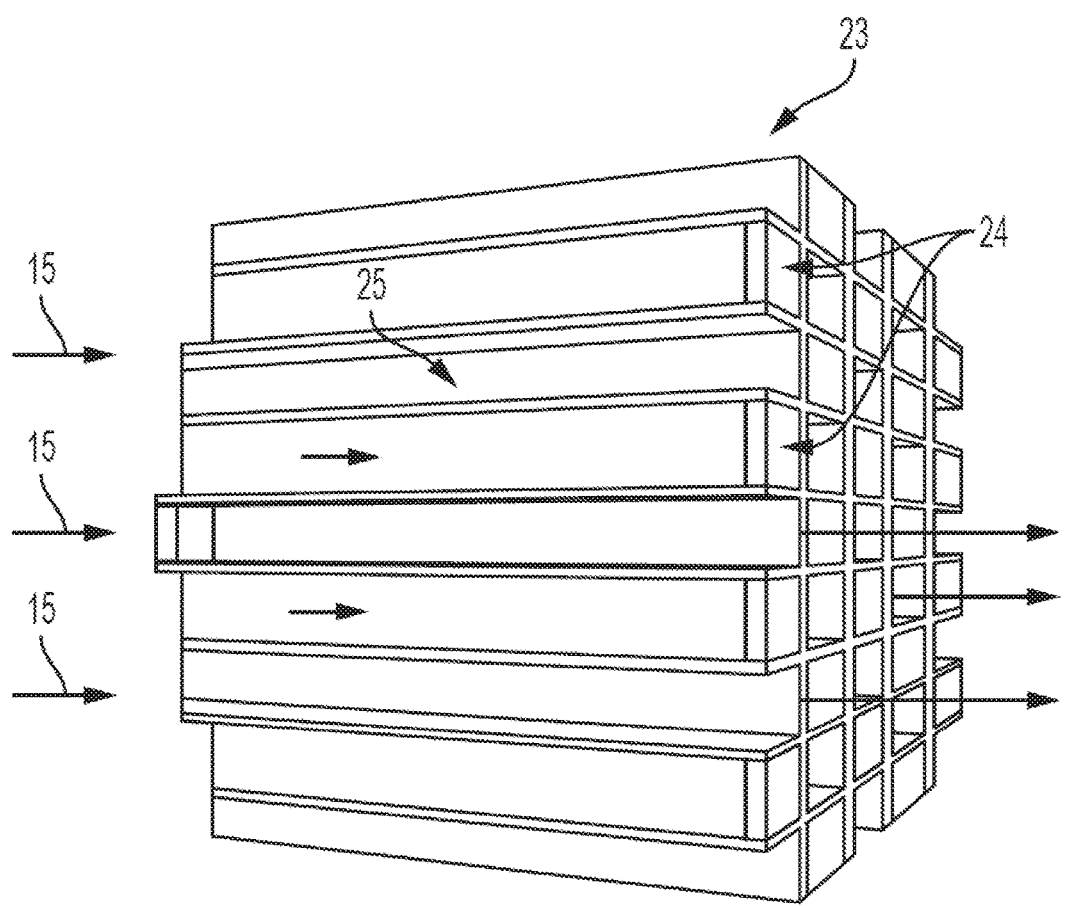
FIG. 2 illustrates a perspective view of a filter substrate, according to one or more embodiments.

SCRF 26 includes a filter substrate 23 shown in FIG. 2 configured to filter exhaust gas 15 of soot, among other species. Filter substrate 23 can be a ceramic or SiC wall flow monolith filter that can be packaged in a shell or canister having an inlet and an outlet in fluid communication with exhaust gas conduit 14. The shell or canister can ideally comprise a substantially inert material, relative to the exhaust gas constituents, such as stainless steel. It is appreciated that the ceramic or SiC wall flow monolith filter is merely exemplary in nature and that filter substrate 23 can include various other physical configurations. For example, filter substrate 23 can comprise a ceramic brick, a plate structure, or a monolithic honeycomb structure. In the example shown, filter substrate 23 comprises a plurality of longitudinally extending passages 24 and 25 that are defined by longitudinally extending walls. The passages include a subset of inlet passages 24 that have an open inlet end and a closed outlet end, and a subset of outlet passages 25 that have a closed inlet end and an open outlet end. Exhaust gas 15 entering the filter 23 through the inlet ends of the inlet passages 24 is forced to migrate through adjacent longitudinally extending walls to the outlet passages 25. It is through this wall flow mechanism that the exhaust gas 15 is filtered of soot.

Filter substrate 23 can be formed from a material capable of withstanding the temperatures and chemical environment associated with the exhaust gas 15. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. Filter substrate 23 has high porosity. Porosity refers to the percentage of voids in a material relative to the total volume of the material. In some embodiments, filter substrate 23 has a porosity of at least about 52%, at least about 55% or at least about 60%. In some embodiments, filter substrate 23 has a porosity of about 55% to about 75%. In one embodiment, filter substrate 23 has a porosity of about 60% to about 65%. Filter substrate 23 can comprise average pore diameter of about 10 micrometers to about 30 micrometers, or about 12 micrometers to about 28 micrometers. In one embodiment, filter substrate 23 comprises an average pore diameter of about 19 micrometers to about 24 micrometers.

SCRF 26 catalytic composition can be applied to filter substrate. The high porosity of filter substrate 23 can ensure porosity even after application of the SCRF 26 catalytic composition. For example, SCRF 26 can include a filter substrate 23 that is dipped into a washcoat containing a SCRF catalytic component. The catalytic component can be applied as a washcoat to the inner walls of inlet passages 24 of the filter, outlet passages 25 of the filter, or both. Generally the washcoat can be applied in an amount of about 60 g to about 180 g of washcoat per liter of SCRF 26 volume, although other amounts of practicable. In some embodiments, the washcoat can be applied in a thickness of about 15 μm to about 50 μm. During operation, SCRF 26 accumulates soot within the passages 24, and optionally within passages 25, and reductant 36 becomes generally disposed on the catalytic component such as through adsorption and/or absorption, for interaction with exhaust gas 15. It should be understood that the description provided of SCRF device 26 is not meant to restrict the definition of a SCRF 26, nor preclude the use of various additional or alternative SCRF 26 designs in conjunction with the embodiments described herein.

The SCRF 26 catalytic composition is generally a porous and high surface area material which can operate efficiently to convert $NO_x$ constituents in the exhaust gas 15 in the presence of a reductant 36, such as ammonia. For example, the catalytic composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalytic composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCRF catalytic compositions can have high thermal structural stability capable of withstanding high-temperature, soot-burning SCRF 26 regeneration techniques described below.

SCRF catalytic composition can optionally further comprise one or more base metal oxides as promoters to further decrease the $SO_3$ formation and to extend catalyst life. Base metal oxides are particularly suitable for vanadia catalyst SCRs. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

SCRF 26 generally uses a reductant 36 to reduce $NO_x$ species (e.g., NO and $NO_2$) to harmless components. Harmless components include one or more of species which are not $NO_x$ species, such as diatomic nitrogen, nitrogen-containing inert species, or species which are considered acceptable emissions, for example. The reductant 36 can be ammonia (NH$_3$), such as anhydrous ammonia or aqueous ammonia, or generated from a nitrogen and hydrogen rich substance such as urea (CO(NH$_2$)$_2$). Additionally or alternatively, the reductant 36 can be any compound capable of decomposing or reacting in the presence of exhaust gas 15 and/or heat to form ammonia. Equations (1)-(5) provide exemplary chemical reactions for NO$_x$ reduction involving ammonia.

$$6NO+4NH_3 \rightarrow 5N_2+6H_2O \quad (1)$$

$$4NO+4NH_3+O_2 \rightarrow 4N_2+6H_2O \quad (2)$$

$$6NO_2+8NH_3 \rightarrow 7N_2+12H_2O \quad (3)$$

$$2NO_2+4NH_3+O_2 \rightarrow 3N_2+6H_2O \quad (4)$$

$$NO+NO_2+2NH_3 \rightarrow 2N_2+3H_2O \quad (5)$$

It should be appreciated that Equations (1)-(5) are merely illustrative, and are not meant to confine SCRF 26 to a particular NO$_x$ reduction mechanism or mechanisms, nor preclude the operation of other mechanisms. SCRF 26 can be configured to perform any one of the above NO$_x$ reduction reactions, combinations of the above NO$_x$ reduction reactions, and other NO$_x$ reduction reactions.

The reductant 36 can be diluted with water in various implementations. In implementations where the reductant 36 is diluted with water, heat (e.g., from the exhaust) evaporates the water, and ammonia is supplied to SCRF 26. Non-ammonia reductants can be used as a full or partial alternative to ammonia as desired. In implementations where the reductant 36 includes urea, the urea reacts with the exhaust to produce ammonia, and ammonia is supplied to SCRF 26. Reaction (6) below provides an exemplary chemical reaction of ammonia production via urea decomposition.

$$CO(NH_2)_2+H_2O \rightarrow 2NH_3+CO_2 \quad (6)$$

It should be appreciated that Equation (6) is merely illustrative, and is not meant to confine the urea or other reductant 36 decomposition to a particular single mechanism, nor preclude the operation of other mechanisms.

When SCRF 26 becomes clogged with soot, the soot can be cleared with high temperature filter regeneration (e.g., soot-burning) strategies. One or multiple regeneration strategies can be implemented and/or optimized by module 50, for example. Regeneration strategies can include raising the temperature of exhaust gas 15 and/or the filter substrate 23 such that soot is oxidized, burned, or otherwise cleared from SCRF 26. Raising the temperature of exhaust gas 15 and/or the filter substrate 23 can be accomplished by one or more of manipulating ICE 12 calibrations to implement a post-injection strategy, utilizing an electrically heated catalyst (EHC) (not shown), utilizing an electric heater (not shown), and utilizing OC 20 disposed upstream from the SCRF in combination with one or more of an after-injection strategy and an auxiliary injection strategy hydrocarbon injection strategy. It should be appreciated that the exhaust gas 15 heating strategies identified above are merely illustrative, and are not meant to preclude the use or suitability of other additional or alternative exhaust gas 15 heating techniques.

Post-injection regeneration strategies can generally include injecting fuel into one or more ICE 12 cylinders after an initial first air-fuel mixture is introduced into the respective cylinder(s), but such that the post-injected fuel is substantially or completely combusted within the cylinder(s). By introducing additional fuel into the cylinder(s), post-injection accordingly imparts additional heat to exhaust gas 15 expelled from the cylinder(s) which subsequently can aid in cleaning SCRF 26. After-injection regeneration strategies manipulate engine calibrations such that fuel after-injected into one or more ICE 12 cylinders is expelled into the exhaust system 10 at least partially uncombusted. When the after-injected fuel contacts OC 20, heat released from oxidation of the fuel is imparted to the exhaust gas treatment system 10. Similarly, an auxiliary injection strategy effects contact between unburnt fuel and OC 20 or like catalytic device to impart heat to exhaust gas treatment system 10. Generally, auxiliary injection comprises introducing fuel or HC to the exhaust gas system 10 upstream from OC 20 or a like catalytic component, but downstream from ICE 12. In some embodiments, fuel or hydrocarbons are introduced to directly to OC 20. In post-injection, after-injection, and auxiliary injection strategies, the fuel can be injected by an auxiliary fuel injector (not shown), for example.

An optional electric heater can be disposed within SCRF 26, upstream from SCRF 26, or in close proximity thereto. The electric heater can be connected to and powered by an electrical source (not shown), and can be selectively activated to heat SCRF 26 or surrounding regions. The electric heater can be constructed of any suitable material that is electrically conductive such as the wound or stacked metal monolith, for example. An EHC comprises similar aspects of the electric heater, and has a catalytic composition applied thereto. And electric heater and/or EHC can be selectively controlled by module 50, for example.

Soot accumulation within SCRF 26 can degrade the performance of SCRF 26, other exhaust gas treatment devices, and devices appurtenant to exhaust gas treatment system 10 (e.g., turbochargers). Accordingly, filter regenerations are performed to burn or otherwise remove soot from SCRF 26. Soot loading can be correlated to a SCRF 26 dP, and a filter regeneration can be initiated when a SCRF 26 dP exceeds a dP threshold. A SCRF 26 dP can be determined using upstream pressure sensor 52 and downstream pressure sensor 54, for example. Similarly, a SCRF 26 dP can be correlated to a SCRF 26 soot loading value, and a filter regeneration can be initiated when the SCRF 26 soot loading exceeds a soot loading threshold. Soot loading can be represented as a mass, or a mass per given volume (e.g., the volume defined by the SCRF 26 filter substrate 23 and catalytic composition), for example.

During initial use within an exhaust gas system (e.g., system 10), the SCRF 26 catalytic composition can undergo degreening in which SCRF 26 performance characteristics are changed. Degreening generally refers to the initial high-temperature physical and/or chemical modification (e.g., sintering) of a catalyst. In particular, a degreened SCRF 26 will exhibit a lower dP than a "fresh" SCRF 26 under identical soot loading conditions. Further, the performance and/or operating characteristics of SCRF 26 typically stabilize after degreening. These effects are particularly pronounced in high porosity filter substrates 23, as described above. For example, the dP of a "fresh" SCRF 26 with 63% porosity, dimensions of 184 mm round and 151 mm long, and washcoat loading of 429 grams can be about 23 kPa at a soot loading of 6 g/L, while the dP of the degreened SCRF 26 can be about 11 kPa at a soot loading of 6 g/L. Accordingly, the systems and methods provided herein relate to modifying system 10 control and monitoring techniques to account for SCRF 26 degreening.

Figure 3:
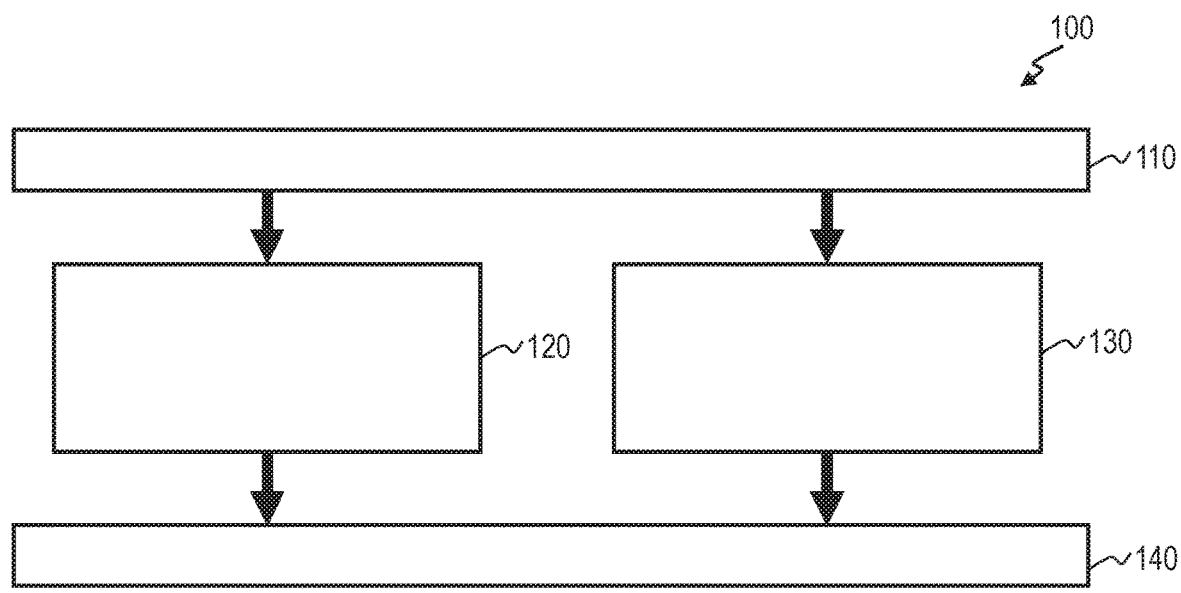
FIG. 3 illustrates a flow chart of a method for controlling and/or monitoring an exhaust gas treatment system, according to one or more embodiments.

FIG. 3 illustrates a flow chart of a method 100 for controlling and/or monitoring an exhaust gas treatment system (e.g., system 10). In particular, method 100 can comprise a method for determining SCRF 26 soot loading, and a method for regenerating a SCRF 26. Method 100 will be described in relation to system 10 for the purpose of clarity only, and is not intended to be limited to the particular configuration of system 10 as described. Method 100 can improve SCRF 26 performance and longevity, particularly by avoiding or minimizing the occurrence of unnecessary filter regenerations. Method 100 comprises determini 110 a SCRF 26 dP, determining 120 a SCRF 26 soot loading using a first dP map if SCRF 26 has not been degreened, or determining 130 a SCRF 26 soot loading using a second dP map if SCRF 26 has been degreened. Method 100 can optionally further comprise initiating 140 a filter regeneration if the determined SCRF 26 soot loading is above a soot loading threshold. A SCRF 26 soot loading threshold can be empirically or theoretically determined, and can be set in order to achieve desired SCRF 26 operating characteristics, for example. For example, a SCRF 26 soot loading threshold can be set in order to ensure a minimum SCRF 26 NOx conversion yield and/or NOx storage level. In other embodiments, a soot loading threshold can be set in order to ensure that the SCRF 26 is capable of withstanding the regeneration conditions required to remove the accumulated soot.

One or more parameters can be defined to determine whether SCRF 26 has been degreened, such that SCRF 26 exhibits degreened qualities (e.g., a reduced dP relative to the dP of a "fresh" SCRF at identical soot loading). Although degreening conditions will vary with the particular size, material, and construction of an SCRF, degreening generally occurs at temperatures much higher than normal SCRF 26 operating temperatures (e.g., >600° C.). When SCRF 26 is incorporated in an exhaust gas treatment system utilized by a vehicle, degreening commonly occurs during one or more SCRF 26 filter regenerations, wherein the exhaust gas 15 and/or SCRF 26 temperature(s) are increased, as described above. Accordingly, in one embodiment, a SCRF 26 can be determined to be degreened if a filter regeneration count threshold has been achieved. For example, a SCRF 26 can be considered degreened if two or more filter regenerations have been conducted. The filter regeneration count can depend on the particular characteristics of the regenerations conducted for a given system 10. Because high temperatures are ideal for soot-burning, but can be detrimental to various system 10 components, regenerations can be conducted at a plurality of temperature levels. For example, a regeneration may heat SCRF 26 to 580° C. for a first time interval, subsequently heat SCRF 26 to 600° C. for a second time interval, and subsequently heat SCRF 26 to a temperature close to about 650° C. for a third time interval.

In another embodiment, a SCRF 26 can be considered to be degreened if a degreening cumulative time and temperature threshold has been achieved, which is defined by the cumulative amount of time SCRF 26 is heated to or above a prescribed temperature for a prescribed duration. For example, a cumulative time and temperature threshold can be 650° C. for 40 minutes. Further, in some embodiments, SCRF 26 can be considered to be degreened if both a degreening cumulative time and temperature threshold has been achieved and a filter regeneration count threshold has been achieved. One or a plurality of cumulative time and temperature thresholds can be determined experimentally or theoretically, and may vary based on particular characteristics of SCRF 26. The degreening cumulative time and temperature threshold can be achieved in a single event or duration, or across multiple events or time frames. For example, the degreening cumulative time and temperature threshold may be achieved after four SCRF 26 filter regeneration events. In one embodiment, a degreening cumulative time and temperature threshold can comprise a time-temperature threshold map wherein the respective time and temperature magnitudes of a plurality of time and temperature thresholds vary inversely. For example, a degreening cumulative time and temperature threshold can comprise a time-temperature threshold map including a cumulative time and temperature threshold defined by a short time and a high temperature (e.g., 80 minutes of degreening at 600° C.) and a cumulative time and temperature threshold defined by a longer time and a lower temperature (e.g., 15 minutes of degreening at 800° C.). Utilization of such a time-temperature threshold map admits that SCRF 26 degreening may occur under a plurality of discrete conditions.

The first dP map and the second dP map ("the dP maps") generally correlate a SCRF 26 dP to a SCRF 26 soot loading level. In some embodiments, the dP maps can comprise multi-variable maps. In such embodiments, the dP maps correlate a SCRF 26 dP, and one or more of the SCRF 26 temperature, the mass flow of exhaust gas 15 through SCRF 26, and the volumetric mass flow of exhaust gas 15 through the SCRF 26, to a SCRF 26 soot loading level. For example, the dP maps can correlate SCRF 26 dP and resistance flow to a soot loading level. Resistance flow is calculated by dividing the SCRF 26 dP by the volumetric flow rate of exhaust gas 15 through SCRF 26. Volumetric flow rate of exhaust gas 15 can be determined using the mass flow rate of exhaust gas 15 and the temperature of exhaust gas 15. Table 1 provides an example of a multi-variable dP map, wherein volumetric flow and resistance flow are mapped to a soot loading:

TABLE 1

Example dP soot loading map

| | | Resistance Flow (P/volumetric flow) | | | | |
|---|---|---|---|---|---|---|
| | | 0 | 0.01 | 0.015 | 0.02 | 0.025 |
| Volumetric flow (volume/time) | 0 | Soot mass | Soot mass | Soot mass | Soot mass | Soot mass |
| | 10 | Soot mass | Soot mass | Soot mass | Soot mass | Soot mass |
| | 20 | Soot mass | Soot mass | Soot mass | Soot mass | Soot mass |
| | 30 | Soot mass | Soot mass | Soot mass | Soot mass | Soot mass |
| | 40 | Soot mass | Soot mass | Soot mass | Soot mass | Soot mass |
| | 50 | Soot mass | Soot mass | Soot mass | Soot mass | Soot mass |
| | 60 | Soot mass | Soot mass | Soot mass | Soot mass | Soot mass |
| | 70 | Soot mass | Soot mass | Soot mass | Soot mass | Soot mass |
| | 80 | Soot mass | Soot mass | Soot mass | Soot mass | Soot mass |
| | 90 | Soot mass | Soot mass | Soot mass | Soot mass | Soot mass |
| | 100 | Soot mass | Soot mass | Soot mass | Soot mass | Soot mass |

In general, because a degreened SCRF 26 exhibits a lower dP than a "fresh" SCRF 26 at identical soot loading levels, the first (i.e., "fresh" SCRF 26) dP map will correlate a given SCRF 26 dP to a lower soot loading than the second (i.e., degreened SCRF 26) dP map. When method 100 further comprises initiating 140 a filter regeneration if the determined SCRF 26 soot loading is above a soot loading threshold, the first dP map requires a higher input SCRF 26 dP to initiate a filter regeneration than the second dP map. The use of two dP maps under "fresh" and degreened SCRF 26 states prevents or minimizes the initiation of unnecessary filter regenerations (i.e., filter regenerations which initiate at a SCRF 26 soot loading below the soot loading threshold), and thereby improves the longevity and performance of SCRF 26 and other devices appurtenant to system 10. In particular, the use of two dP maps can reduce or eliminate false alarms and/or unnecessary maintenance procedures triggered by a relatively high dP measured in a "fresh" SCRF.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for regenerating a selective catalytic reduction particulate filter device (SCRF) utilized by an internal combustion engine (ICE) exhaust gas treatment system, wherein the exhaust gas treatment system includes the ICE configured to communicate exhaust gas to the SCRF, and the SCRF comprises a porous filter substrate and a catalytic composition capable of reducing NOx applied thereto, the method comprising:

determining a SCRF pressure differential (dp);

determining, via a control module including a $1^{st}$ SCRF dP map and a $2^{nd}$ SCRF dP map, a SCRF soot loading using:

the $1^{st}$ SCRF dP map if the SCRF has not been degreened;

the $2^{nd}$ SCRF dP map if the SCRF has been degreened, wherein the control module is operably connected to the SCRF, the ICE, one or more pressure sensors, and/or one or more temperature sensors; and initiating a filter regeneration in response to the determined SCRF soot loading being above a soot loading threshold.

2. The method of claim 1, wherein the SCRF has been degreened if a degreening cumulative time and temperature threshold has been achieved.

3. The method of claim 1, wherein the SCRF has been degreened if a filter regeneration count threshold has been achieved.

4. The method of claim 1, wherein the filter regeneration comprises raising the temperature of exhaust gas and/or the filter substrate by one or more of manipulating ICE calibrations to implement a post-injection strategy, utilizing an electrically heated catalyst, utilizing an electric heater, and utilizing an oxidizing catalyst device disposed upstream from the SCRF in combination with one or more of an after-injection strategy and an auxiliary injection strategy hydrocarbon injection strategy.

5. The method of claim 1, wherein the $1^{st}$ SCRF dP map and the $2^{nd}$ SCRF dP map correlate the SCRF dP and one or more of the SCRF temperature, the mass flow of exhaust gas through the SCRF, and the volumetric flow of exhaust gas through the SCRF to a SCRF soot loading level.

6. The method of claim 1, wherein the SCRF filter substrate comprises a porosity of at least 52%.

7. The method of claim 1, wherein the SCRF filter substrate comprises a porosity of at least about 60%.

8. The method of claim 1, wherein the SCRF filter substrate comprises a porosity of 55% to 75%.

9. The method of claim 1, wherein the SCRF comprises a catalytic composition loading of about 60 grams per liter to 180 grams per liter.

10. The method of claim 1, wherein the SCRF filter substrate comprises an average pore size of about 12 micrometers to 28 micrometers.

11. The method of claim 1, wherein the SCRF catalytic composition comprises a metal-impregnated zeolite.

* * * * *